US011972471B1

(12) United States Patent
Yang et al.

(10) Patent No.: US 11,972,471 B1
(45) Date of Patent: Apr. 30, 2024

(54) METHOD AND APPARATUS FOR USER'S FOOD TASTE INTELLIGENCE-BASED PERSONALIZED RECOMMENDATIONS USING ONTOLOGY AND MACHINE LEARNING

(71) Applicant: FARMKIT INC., Sejong-si (KR)

(72) Inventors: Sun Hung Yang, Gyeryong-si (KR); Seok Hwan Kim, Yongin-si (KR)

(73) Assignee: FARMKIT INC., Sejong-si (KR)

( * ) Notice: Subject to any disclaimer, the term of this patent is extended or adjusted under 35 U.S.C. 154(b) by 0 days.

(21) Appl. No.: 18/229,297

(22) Filed: Aug. 2, 2023

(30) Foreign Application Priority Data

Nov. 29, 2022 (KR) .................. 10-2022-0162660

(51) Int. Cl.
  *G06Q 30/00* (2023.01)
  *G06Q 30/0601* (2023.01)
(52) U.S. Cl.
  CPC ..... *G06Q 30/0631* (2013.01); *G06Q 30/0633* (2013.01)
(58) Field of Classification Search
  CPC .............................................. G06Q 30/06–08
  See application file for complete search history.

(56) References Cited

U.S. PATENT DOCUMENTS

| 2018/0040027 | A1* | 2/2018 | Han ...................... G06Q 30/06 |
| 2022/0374966 | A1* | 11/2022 | Saint-Pierre ....... G06Q 30/0603 |
| 2023/0079759 | A1* | 3/2023 | Hashimoto .......... G06Q 30/015 |
| | | | 702/54 |

FOREIGN PATENT DOCUMENTS

| KR | 10-2020-0118584 A | 10/2020 |
| KR | 10-2021-0019392 A | 2/2021 |
| KR | 10-2021-0031975 A | 3/2021 |
| KR | 10-2278646 A | 7/2021 |
| KR | 10-2278810 B1 | 7/2021 |
| KR | 10-2022-0128145 A | 9/2022 |

OTHER PUBLICATIONS

Ha-Gyeong Yu, et al., "The Study on Design an Ontology for Korean Food Information", JKCA, 2019, pp. 147-158, vol. 19, No. 2.

* cited by examiner

*Primary Examiner* — Ethan D Civan
(74) *Attorney, Agent, or Firm* — Pearne & Gordon LLP (57) ABSTRACT

Provided are a method and apparatus for user's food taste intelligence-based personalized recommendations, wherein the method includes collecting evaluation information including an evaluation of each of a plurality of foods, calculating association scores of the foods on the basis of the evaluation information, and ontology-based information previously possessed for the foods, and recommending one or more foods on the basis of first behavioral information of a user and the association scores.

10 Claims, 8 Drawing Sheets

| EVALUATION INFORMATION AND RELIABILITY SCORE OF EVALUATION INFORMATION ||||||| 
|---|---|---|---|---|---|---|
| EVALUA-TOR | FOOD NAME | ASSOCIATED FOOD1 | ASSOCIATED FOOD2 | EVALUATION INFORMATION | TIME TAKEN | RELIAB-ILITY |
| user1 | KIMCHI FRIED RICE | RICE WITH KIMCHI | | not answered | 0.3ms | 95% |
| user1 | STIR-FRIED OCTOPUS | STIR-FRIED WEBFOOT OCTOPUS | OCTOPUS DURUCHIGI | NOT GOOD | 10ms | 97% |
| user1 | BULGOG | HOT POT BULGOGI | GWANGYANG BULGOGI | GOOD | 15.9ms | 96% |
| user1 | HOT STONE POT BIBIMBAP | BIBIMBAP | | BEST | 8.9ms | 96% |
| user1 | SAUSAGE STEW | HAM KIMCHI STEW | | not answered | 0.1ms | 94% |
| user1 | SEASONED FUSIFORMIS | SEASONED GREEN LAVER | | NOT GOOD | 7.5ms | 96% |
| user1 | NOODLES WITH BLACK SOYBEAN SAUCE | BLACK-BEAN-SAUCE NOODLES | SEAFOOD AND NOODLES WITH BLACK SOYBEAN SAUCE | BEST | 8.3ms | 98% |
| user1 | PEPPER GIMBAP | | | GOOD | 5.4ms | 97% |
| user1 | STIR-FRIED ANCHOVIES | STIR-FRIED BABY ANCHOVIES | | not answered | 0.1ms | 96% |
| user2 | CHICKEN BREAST SANDWICH | ROAST CHICKEN SANDWICH | | NOT GOOD | 0.1ms | 5% |
| user2 | DOUGHNUT | RING DOUGHNUT | TWISTED BREAD STICK | NOT GOOD | 0.1ms | 4% |
| user2 | ROLL CAKE | | | NOT GOOD | 0.2ms | 6% |
| user2 | RING DOUGHNUT | DOUGHNUT | TWISTED BREAD STICK | NOT GOOD | 0.1ms | 2% |
| user3 | SPICY RAW FISH SALAD | COLD RAW FISH SOUP | | NOT GOOD | 7.2ms | 87% |
| user3 | KIMCHI STEW | KIMCHI HOT POT | PORK AND KIMCHI STEW | NOT GOOD | 8.3ms | 35% |
| user3 | RED BEAN SHERBET | | | BEST | 7.5ms | 78% |
| user3 | GRILLED SAURY | GRILLED HERRING | GRILLED MACKEREL | BEST | 8.3ms | 48% |
| user3 | COLD RAW FISH SOUP | SPICY RAW FISH SALAD | | NOT GOOD | 1.3ms | 35% |
| user3 | GRILLED SPAM | GRILLED HAM | GRILLED SAUSAGE | NOT GOOD | 5.4ms | 78% |
| user3 | PICKLED PERILLA LEAVES | PICKLED PUMPKIN LEAVES | | GOOD | 7.5ms | 65% |
| user3 | BOILED PEANUTS | COOKED BEANS | | NOT GOOD | 8.3ms | 65% |
| user3 | KIMCHI HOT POT | KIMCHI STEW | | BEST | 5.4ms | 35% |
| user3 | GRILLED HERRING | GRILLED SAURY | GRILLED SPANISH MACKEREL | NOT GOOD | 2.5ms | 48% |
| user3 | LEEK PANCAKE | WELSH-ONION PANCAKE | | not answered | 0.2ms | 27% |
| user3 | GRILLED SAUSAGE | GRILLED HAM | GRILLED VIENNA SAUSAGE | NOT GOOD | 15.9ms | 78% |

| EVALUATION INFORMATION AND RELIABILITY SCORE OF EVALUATION INFORMATION ||||||||
| EVALUA-TOR | FOOD NAME | ASSOCIATED FOOD1 | ASSOCIATED FOOD2 | ... | EVALUATION INFORMATION | TIME TAKEN | RELIAB-ILITY |
|---|---|---|---|---|---|---|---|
| user1 | KIMCHI FRIED RICE | RICE WITH KIMCHI | | | not answered | 0.3ms | 95% |
| user1 | STIR-FRIED OCTOPUS | STIR-FRIED WEBFOOT OCTOPUS | OCTOPUS DURUCHIGI | | NOT GOOD | 10ms | 97% |
| user1 | BULGOG | HOT POT BULGOGI | GWANGYANG BULGOGI | | GOOD | 15.9ms | 96% |
| user1 | HOT STONE POT BIBIMBAP | BIBIMBAP | | | BEST | 8.9ms | 96% |
| user1 | SAUSAGE STEW | HAM KIMCHI STEW | | | not answered | 0.1ms | 94% |
| user1 | SEASONED FUSIFORMIS | SEASONED GREEN LAVER | | | NOT GOOD | 7.5ms | 96% |
| user1 | NOODLES WITH BLACK SOYBEAN SAUCE | BLACK-BEAN-SAUCE NOODLES | SEAFOOD AND NOODLES WITH BLACK SOYBEAN SAUCE | | BEST | 8.3ms | 98% |
| user1 | PEPPER GIMBAP | | | | GOOD | 5.4ms | 97% |
| user1 | STIR-FRIED ANCHOVIES | STIR-FRIED BABY ANCHOVIES | | | not answered | 0.1ms | 96% |
| user2 | CHICKEN BREAST SANDWICH | ROAST CHICKEN SANDWICH | | | NOT GOOD | 0.1ms | 5% |
| user2 | DOUGHNUT | RING DOUGHNUT | TWISTED BREAD STICK | | NOT GOOD | 0.1ms | 4% |
| user2 | ROLL CAKE | | | | NOT GOOD | 0.2ms | 6% |
| user2 | RING DOUGHNUT | DOUGHNUT | TWISTED BREAD STICK | | NOT GOOD | 0.1ms | 2% |
| user3 | SPICY RAW FISH SALAD | COLD RAW FISH SOUP | | | NOT GOOD | 7.2ms | 87% |
| user3 | KIMCHI STEW | KIMCHI HOT POT | PORK AND KIMCHI STEW | | NOT GOOD | 8.3ms | 35% |
| user3 | RED BEAN SHERBET | | | | BEST | 7.5ms | 78% |
| user3 | GRILLED SAURY | GRILLED HERRING | GRILLED MACKEREL | | BEST | 8.3ms | 48% |
| user3 | COLD RAW FISH SOUP | SPICY RAW FISH SALAD | | | NOT GOOD | 1.3ms | 35% |
| user3 | GRILLED SPAM | GRILLED HAM | GRILLED SAUSAGE | | NOT GOOD | 5.4ms | 78% |
| user3 | PICKLED PERILLA LEAVES | PICKLED PUMPKIN LEAVES | | | GOOD | 7.5ms | 65% |
| user3 | BOILED PEANUTS | COOKED BEANS | | | NOT GOOD | 8.3ms | 65% |
| user3 | KIMCHI HOT POT | KIMCHI STEW | | | BEST | 5.4ms | 35% |
| user3 | GRILLED HERRING | GRILLED SAURY | GRILLED SPANISH MACKEREL | | NOT GOOD | 2.5ms | 48% |
| user3 | LEEK PANCAKE | WELSH-ONION PANCAKE | | | not answered | 0.2ms | 27% |
| user3 | GRILLED SAUSAGE | GRILLED HAM | GRILLED VIENNA SAUSAGE | | NOT GOOD | 15.9ms | 78% |

FIG. 6

| ONTOLOGY-BASED INFORMATION |||||||||
|---|---|---|---|---|---|---|---|---|
| FOOD NAME | FOOD NGREDIENTS | SEASONING INGREDIENTS | MEAT BROTH INGREDIENTS | SAUCE INGREDIENTS | RECIPE | COUNTRY-SPECIFIC | SITUATION-SPECIFIC | ...... |
| KIMCHI FRIED RICE | CABBAGE KIMCHI | RED PEPPER POWDER | | | STIR-FRY | KOREAN FOOD | LUNCH MENU | |
| GRILLED SAURY | PACIFIC SAURY | SALT, PEPPER | | SOY SAUCE | STIR-FRY | KOREAN FOOD | DINNER MENU | |
| BULGOGI | BEEF | BULGOGI SEASONING | ANCHOVY STOCK | | STIR-FRY | KOREAN FOOD | DINNER MENU | |
| PORK CUTLET | PORK, BREAD CRUMBS | SALT, PEPPER | | PORK CULTLET SAUCE | MIXING | JAPANESE FOOD | LUNCH MENU | |
| NOODLES WITH BLACK SOYBEAN SAUCE | PORK, ONION | TIANMIAN-JIANG | STARCH WATER | | STIR-FRY | CHINESE FOOD | LUNCH MENU | |
| ...... | ...... | ...... | ...... | ...... | ...... | ...... | ...... | |

FIG. 7

| | ASSOCIATION DEGREE BETWEEN KIMCHI STEW AND KIMCHI HOT POT | | | | | | | | |
|---|---|---|---|---|---|---|---|---|---|
| | FOOD NAME | FOOD INGREDIENTS | SEASONING INGREDIENTS | MEAT BROTH INGREDIENTS | SAUCE INGREDIENTS | RECIPE | COUNTRY-SPECIFIC | SITUATION-SPECIFIC | ... |
| ITEM-SPECIFIC ASSOCIATION DEGREE | 50% | 95% | 100% | 100% | | 80% | 100% | 50% | |
| FINAL ASSOCIATION DEGREE | 82% | | | | | | | | |

FIG. 8

METHOD AND APPARATUS FOR USER'S FOOD TASTE INTELLIGENCE-BASED PERSONALIZED RECOMMENDATIONS USING ONTOLOGY AND MACHINE LEARNING

CROSS-REFERENCE TO RELATED APPLICATION

This application is based on and claims priority under 35 U.S.C. § 119 to Korean Patent Application No. 10-2022-0162660, filed on Nov. 29, 2022, in the Korean Intellectual Property Office, the disclosure of which is incorporated by reference herein in its entirety.

BACKGROUND

1. Field

The disclosure relates to a method and apparatus for user's food taste intelligence-based personalized recommendations using ontology and machine learning.

2. Description of the Related Art

Recently, various services have been developed to curate restaurant menus to users of delivery applications or to recommend food-related products at food-related shopping malls. Existing services, which recommend restaurant menus and products, are provided in simple methods, such as traditional statistical methods or recommending products in the same category, without considering tastes of users. However, services, which recommend restaurant menus or products without considering personal tastes or preferences, are unlikely to attract attentions of users.

Therefore, there is a need for a service that may recommend a restaurant menu or product by considering a taste or preference of a user.

The related art described above is technical information possessed by the inventor to derive the disclosure or acquired in the process of deriving the disclosure, and may not be necessarily referred to as a known art published to the general public prior to the filing of the disclosure.

SUMMARY

Provided are a method and apparatus for user's food taste intelligence-based personalized recommendations using ontology and machine learning. Provided is a computer-readable recording medium having recorded thereon a program for executing the method on a computer.

The problems to be solved by the disclosure are not limited to the problems mentioned above, and other problems and advantages of the disclosure that are not mentioned may be understood from the following description and may be more clearly understood from embodiments. In addition, it may be understood that the problems and advantages to be solved by the disclosure may be implemented by units defined by claims and combinations thereof.

Additional aspects will be set forth in part in the description which follows and, in part, will be apparent from the description, or may be learned by practice of the presented embodiments of the disclosure.

According to an aspect of the disclosure, a method for user's food taste intelligence-based personalized recommendations using ontology and machine learning includes collecting evaluation information including an evaluation of each of a plurality of foods, calculating association scores of the foods on the basis of the evaluation information, and ontology-based information previously possessed for the foods, and recommending at least one food on the basis of first behavioral information of the user and the association scores.

According to another aspect of the disclosure, a computing apparatus includes at least one memory and at least one processor, wherein the at least processor is configured to collect evaluation information including an evaluation of each of a plurality of foods, calculate association scores of the foods on the basis of the evaluation information, and ontology-based information regarding the foods, and recommend at least one food on the basis of first behavioral information of a user and the association scores.

According to another aspect of the disclosure, a computer-readable recording medium has recorded thereon a program for executing the method on a computer.

In addition, provided are another method and another system for implementing the disclosure, and a computer-readable recording medium that stores a computer program for executing the method.

Aspects, features, and advantages other than those described above will become apparent from the following drawings, claims, and description.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a view illustrating an example of evaluation information including an evaluation of each of a plurality of foods, according to an embodiment;

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments are described in connection with the accompanying drawings. While various changes in form and details may be made in various embodiments and may have various embodiments, particular embodiments are illustrated in the drawings and the related detailed descriptions are given. However, this is not intended to limit the various embodiments to a particular embodiment, but should be understood to include all changes and/or equivalents or alternatives included in the spirit and scope of the various embodiments. In relation to the description of the drawings, like reference numerals denote like elements.

The terms "comprises", "includes", "may comprise" or "may include" that may be used in various embodiments refers to the presence of a corresponding function, operation, or component that has been disclosed, and does not limit one or more additional functions, operations, or components. In addition, it will be further understood that the terms "comprises", "includes", "has", and the like when used in various embodiments specify the presence of stated features, integers, steps, operations, elements, and/or components, but do not preclude the presence or addition of one or more other features, integers, steps, operations, elements, components, and/or groups thereof.

As used herein, the term "and/or," includes any and all combinations of one or more of the associated listed items. For example, "A or B" may include A, B, or both A and B.

The terms "first", "second", etc. used in various embodiments may modify various components of various embodiments, but do not limit the corresponding components. For example, the terms do not limit the order and/or importance of the corresponding components. The terms may be used to distinguish one component from another. For example, both a first user device and a second user device are user devices, and represent different user devices. For example, a first element could be termed a second element, and, similarly, a second element could be termed a first element, without departing from the scope of various embodiments.

It will be understood that when an element is referred to as being "connected to" or "coupled to" another element, it may be directly connected or coupled to the other element or intervening elements may be present. In contrast, when an element is referred to as being "directly connected to" or "directly coupled to" another element, there are no intervening elements present.

In embodiments, the terms "module," "unit," "part", etc. refer to components that perform at least one function or operation, and the components may be implemented as hardware, software, or a combination of hardware and software. In addition, a plurality of "modules", "units", "parts", etc. may be integrated into at least one module or chip and implemented as at least one processor, except that each needs to be implemented as individual particular hardware.

The terminology used herein is for the purpose of describing a particular embodiment only and is not intended to be limiting of various embodiments. The singular forms are intended to include the plural forms as well, unless the context clearly indicates otherwise.

Some embodiments may be represented as functional block components and various processing steps. Some or all of these functional blocks may be implemented as various numbers of hardware and/or software components that execute particular functions. For example, the functional blocks of the disclosure may be implemented by one or more microprocessors, or by circuit components for a certain function. In addition, for example, the functional blocks of the disclosure may be implemented in various programming or scripting languages. The functional blocks may be implemented as an algorithm executed on one or more processors. In addition, the disclosure may employ related arts for electronic environment configuration, signal processing, and/or data processing. The terms "mechanism", "element", "means" and "component" may be widely used and are not limited as mechanical and physical components.

In addition, connection lines or connection members between components shown in the drawing are only examples of functional connections and/or physical or circuit connections. In real devices, connections between components may be represented by various functional connections, physical connections, or circuit connections that are replaceable or added.

Unless otherwise defined, all terms (including technical and scientific terms) used herein have the same meaning as commonly understood by one of ordinary skill in the art to which various embodiments belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, various embodiments will be described in detail with reference to the accompanying drawings.

Figure 1:
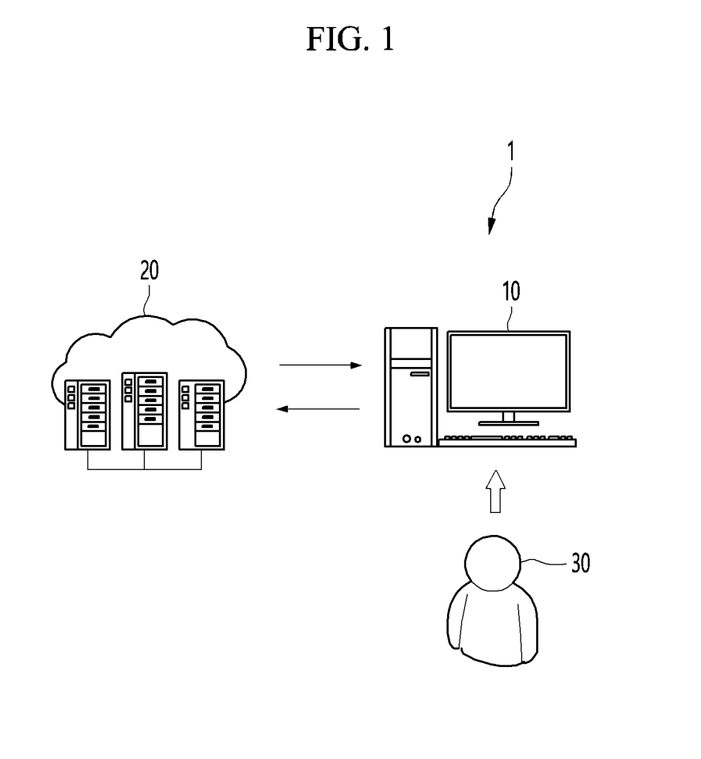
FIG. 1 is a view illustrating an example of a system for user's food taste intelligence-based personalized recommendations, according to an embodiment.

FIG. 1 is a view illustrating an example of a system for user's food taste intelligence-based personalized recommendations, according to an embodiment.

Referring to FIG. 1, a system 1 includes a user terminal 10 and a server 20. For example, the user terminal 10 and the server 20 may be connected to each other by a wired or wireless communication method to transmit and receive data (e.g., evaluation information, ontology-based information, first behavioral information of a user, second behavioral information of the user, and the like) to and from each other.

For convenience of description, FIG. 1 illustrates that the system 1 includes the user terminal 10 and the server 20, but the disclosure is not limited thereto. For example, the system 1 may include another external device (not shown), and operations of the user terminal 10 and the server 20 described below may be implemented by a single device (e.g., the user terminal 10 or the server 20).

The user terminal 10 may be a computing apparatus that includes a display apparatus and a device (e.g., a keyboard, a mouse, or the like) for receiving a user input, and includes a memory and a processor. For example, the user terminal 10 may include, a notebook personal computer (PC), a desktop PC, a laptop, a tablet computer, a smartphone, or the like, but is not limited thereto.

The server 20 may be an apparatus that communicates with an external device (not shown), including the user terminal 10. For example, the server 20 may be an apparatus that stores various types of data, including evaluation information, ontology-based information, first behavioral information of a user, and second behavioral information of the user, and in some cases, may be an apparatus having a self-computational capability. For example, the server 20 may be a cloud server, but is not limited thereto.

The system 1 according to an embodiment recommends one or more foods on the basis of behavioral information of a user 30 as well as an association score based on evaluation information and ontology-based information regarding foods. In detail, the user terminal 10 collects evaluation information including an evaluation of each of a plurality of foods, calculates association scores of the foods on the basis of the evaluation information, and ontology-based information previously possessed for the foods, and recommends one or more foods on the basis of first behavioral information of the user 30 and the association scores. The user 30 may identify information regarding various foods suitable for the taste of the user 30 and foods accurately reflecting the taste of the user 30.

The evaluation information refers to information including an evaluation of each of a plurality of foods by a respondent. For example, the evaluation information may refer to information, which is rated as "good" for a food called kimchi fried rice by a respondent named Kim Yeong Cheol, from among "best", "good", "not good", and "not answered". Here, the evaluation information is unrelated to whether or not Kim Yeong Cheol is the user 30. Accordingly, Kim Yeong Cheol may not be the user 30 or may be the user 30.

The ontology-based information previously possessed for the foods may refer to information corresponding to a plurality of items for each of the plurality of foods. Meanwhile, the ontology-based information may include information classified into items. For example, the ontology-based information may include, for food called "kimchi fried rice", information called "cabbage kimchi" in a food ingredient item. In addition, the ontology-based information may include, for the food called "kimchi fried rice", information called "red pepper powder" in a seasoning ingredient item, information called "stir-fried" in a recipe item, information called "Korean food" in a country item, and information called "lunch menu" in a situation item. Here, items may be categories indicating characteristics of foods, and may include categories such as food ingredient, seasoning ingredients, meat broth ingredients, sauce ingredients, recipes, countries, and situations.

The first behavioral information may refer to information corresponding to a shopping behavior history of the user 30 or a purchaser regarding a food, which is acquired from the user terminal 10 or an external apparatus (not shown). For example, the first behavioral information may include at least one of information regarding a food clicked by the user 30 before receiving a recommendation of the food, a stay time on a page indicating the clicked food, information indicating whether or not the clicked food is added to a shopping cart, and information regarding a purchase history of the clicked food. Here, the external apparatus (not shown) may be a purchaser terminal (not shown) or a seller terminal (not shown).

Meanwhile, the system 1 may include the user terminal 10, a purchaser terminal (not shown), and the server 20. Here, the user terminal 10 may be a seller terminal. In detail, the server 20 or the user terminal 10 may receive first behavioral information of a purchaser from the purchaser terminal (not shown). In addition, the server 20 or the user terminal 10 may collect evaluation information including an evaluation of each of a plurality of foods, calculate association scores of the foods on the basis of the evaluation information, and ontology-based information previously possessed for the foods, and recommend one or more foods on the basis of the first behavioral information of the purchaser and the association scores.

Hereinafter, referring to FIGS. 2 to 7, examples will be described in which the user terminal 10 collects evaluation information including an evaluation of each of a plurality of foods, calculates association scores of the foods on the basis of the evaluation information, and ontology-based information previously possessed for the foods, and recommends one or more foods on the basis of first behavioral information of the user 30 and the association scores. Meanwhile, operations described below with reference to FIGS. 2 to 7 may also be performed by the server 20, as described above with reference to FIG. 1.

Figure 2:
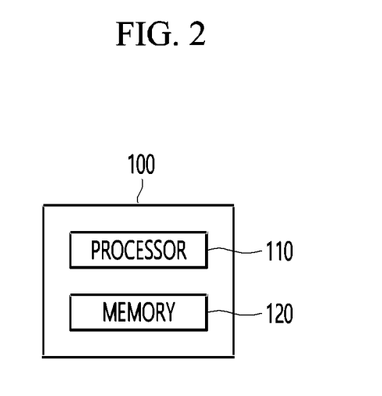
FIG. 2 is a block diagram illustrating an example of a user terminal according to an embodiment.

FIG. 2 is a block diagram illustrating an example of a user terminal according to an embodiment.

Referring to FIG. 2, a user terminal 100 includes a processor 110 and a memory 120. For convenience of description, FIG. 2 illustrates only components related to the disclosure. The user terminal 100 may further include other general-purpose components, in addition to the components illustrated in FIG. 2. For example, the user terminal 100 may include an input/output interface (not shown) and/or a communication module (not shown). In addition, it is obvious to one of ordinary skill in the art related to the disclosure that the processor 110 and the memory 120 illustrated in FIG. 2 may be implemented as independent devices.

The processor 110 may process an instruction of a computer program by performing basic arithmetic, logic, and input/output operations. Here, the instruction may be provided from the memory 120 or an external apparatus (e.g., the server 20 or the like). In addition, the processor 110 may control overall operations of other components included in the user terminal 100.

In particular, the processor 110 recommends one or more foods on the basis of behavioral information of a user as well as association scores based on evaluation information and ontology-based information regarding food. In detail, the processor 110 collects evaluation information including an evaluation of each of a plurality of foods, calculates association scores of the foods on the basis of the evaluation information, and ontology-based information previously possessed for the foods, and recommends one or more foods on the basis of first behavioral information of the user 30 and the association scores.

Detailed examples in which the processor 110 according to an embodiment operates will be described with reference to FIGS. 3 to 7.

The processor 110 may be implemented as an array of a plurality of logical gates, or may be implemented as a combination of a general-purpose microprocessor and a memory that stores a program that may be executed by the microprocessor. For example, the processor 110 may include a general-purpose processor, a central processing unit (CPU), a microprocessor, a digital signal processor (DSP), a controller, a microcontroller, a state machine, or the like. In some environments, the processor 110 may also include an application-specific integrated circuit (ASIC), a programmable logic device (PLD), a field programmable gate array (FPGA), or the like. For example, the processor 110 may also refer to a combination of processing devices such as a combination of a DSP and a microprocessor, a combination of a plurality of microprocessors, a combination of one or more microprocessors combined with a DSP core, or any combination of components mentioned above.

The memory 120 may include any non-transitory computer-readable recording medium. For example, the memory 120 may include a permanent mass storage device such as random access memory (RAM), read only memory (ROM), a disk drive, a solid state drive (SSD), or flash memory. As another example, the permanent mass storage device, such as ROM, an SSD, flash memory, or a disk drive, may be a separate permanent storage device that is distinguished from a memory. In addition, the memory 210 may store an operating system (OS) and at least one program code (e.g., code for the processor 110 to perform operations described below with reference to FIGS. 3 to 7).

Software components described above may be loaded from a computer-readable recording medium separate from the memory 120. The separate computer-readable recording medium may be a recording medium that may be directly connected to the user terminal 100, e.g., may include a computer-readable recording medium such as a floppy drive, a disk, a tape, a DVD/CD-ROM drive, a memory card, or the like. Alternatively, the software components may also be loaded into the memory 120 via a communication module (not shown), rather than into a computer-readable recording medium. For example, at least one program may be loaded into the memory 120 on the basis of a computer program (e.g., a computer program and the like for the processor 110 to perform operations described below with reference to FIG. 3 to FIG. 7) installed by files provided via a communication module (not shown) by developers or a file distribution system that distributes an installation file of an application.

An input/output interface (not shown) may be a unit for an interface with a device (e.g., a keyboard, a mouse, or the like) for an input or output, which may be connected to the user terminal 100 or included in the user terminal 100. The input/output interface (not shown) may be configured separately from the processor 110, but is not limited thereto, and the input/output interface (not shown) may be configured to be included in the processor 110.

The communication module (not shown) may provide a component or function for the server 20 and the user terminal 100 to communicate with each other via a network. In addition, the communication module (not shown) may provide a component or function for the user terminal 100 to communicate with another external device. For example, a control signal, an instruction, data, and the like, which are provided under control of the processor 110, may be transmitted to the server 20 and/or the external device through the communication module (not shown) and the network.

Meanwhile, although not shown in FIG. 2, the user terminal 100 may further include a display apparatus. Alternatively, the user terminal 100 may be connected to an independent display apparatus in a wired or wireless communication method to transmit and receive data to and from each other.

Figure 3:
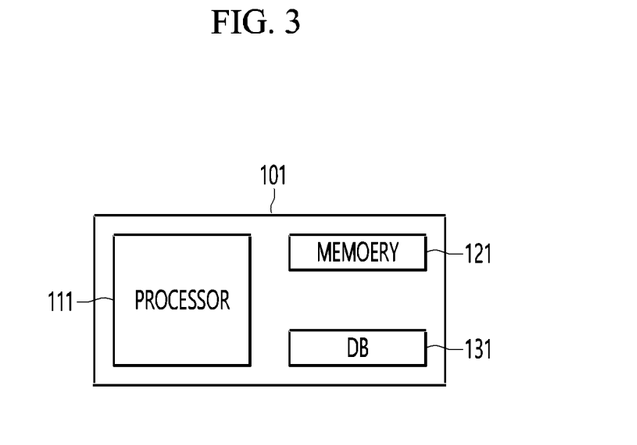
FIG. 3 is a block diagram illustrating another example of a user terminal according to an embodiment.

FIG. 3 is a block diagram illustrating another example of a user terminal according to an embodiment.

Referring to FIG. 3, a user terminal 101 includes a processor 111, a memory 121, and a database (DB) 131. Meanwhile, the processor 111 and the memory 121 of FIG. 3 correspond to the processor 110 and the memory 120 of FIG. 2. Accordingly, detailed descriptions of the processor 111 and the memory 121 are omitted below.

The DB 131 may be hardware that stores various types of data processed within the user terminal 101, and may store programs for processing and control by the processor 111. The DB 131 may include a big data-based DB.

The DB 131 may include RAM such as dynamic random access memory (DRAM) or static random access memory (SRAM), ROM, electrically erasable programmable read-only memory (EEPROM), CD-ROM, Blu-ray, another optical disk storage, an HDD, an SSD, or flash memory. The processor 111 controls the overall operation of the user terminal 101. For example, the processor 111 may overall control an input unit (not shown), a display (not shown), a communicator (not shown), the DB 131, and the like by executing programs stored in the DB 131. The processor 111 may control the operation of user terminal 101 by executing the programs stored in the DB 131.

Meanwhile, the DB 131 may include an evaluation information DB and an ontology information DB. The evaluation information DB may be hardware for storing evaluation information processed within the user terminal 101. The evaluation information DB may include a normal evaluation information DB and an abnormal evaluation information DB. The ontology information DB may be hardware that stores ontology-based information processed within the user terminal 101.

Figure 4:
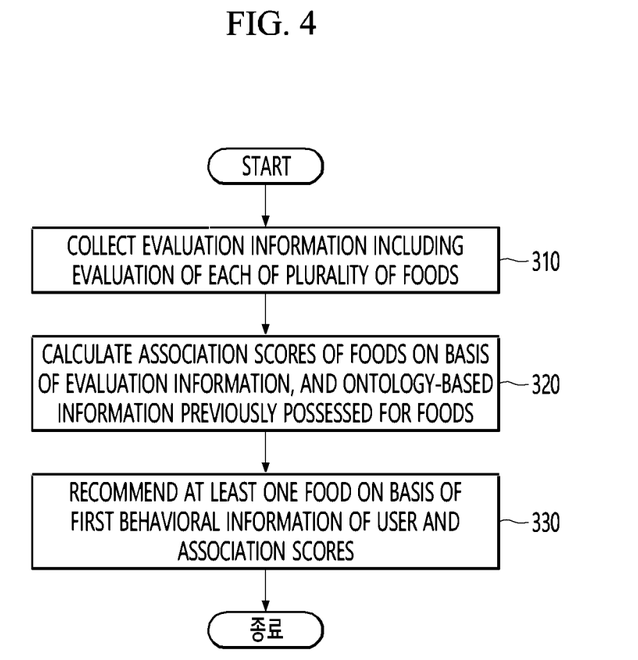
FIG. 4 is a flowchart illustrating an example of a method of recommending a food that suits a taste of a user, according to an embodiment.

FIG. 4 is a flowchart illustrating an example of a method of recommending a food that suits a taste of a user, according to an embodiment.

Referring to FIG. 4, the method of recommending a food that suits a taste of a user includes operations processed in time series by the user terminal 10, 100, or 101, or the processor 110 or 111 shown in FIGS. 1, 2, and 3. Therefore, although the above descriptions of the user terminals 10, 100, and 101 or the processors 110 and 111 shown in FIGS. 1, 2, and 3 are omitted below, the descriptions may also be applied to the method of recommending a food that suits a taste of a user, illustrated in FIG. 4.

In operation 310, a processor collects evaluation information including an evaluation of each of a plurality of foods.

As an example, the processor may collect evaluation information from a server and store the collected evaluation information in a DB. As another example, the processor may collect evaluation information from an input of a user and store the collected evaluation information in the DB, but is not limited thereto.

Meanwhile, the processor may calculate a reliability score of the evaluation information on the basis of the evaluation information, a time taken for an evaluation, and a difference between evaluation information of at least one of the plurality of foods and evaluation information regarding an associated food thereof. The processor may calculate a reliability score of the corresponding evaluation information to be low in response to the time taken for the evaluation being less than or equal to a preset threshold time. For example, on the basis that the preset threshold time is 0.1 ms, the processor may calculate the reliability score of the corresponding evaluation information to be low in response to the time taken for the evaluation being less than or equal to 0.1 ms. However, when the corresponding evaluation information is similar to evaluation information regarding an associated food, the processor may calculate the reliability score of the corresponding evaluation information to be high. For example, when a time taken for evaluating a food called kimchi stew as "good" is 0.05 ms, the processor may calculate a reliability score of the corresponding evaluation information to be low. However, when evaluation information "good" by the same user is present for a food called kimchi hot pot, the kimchi stew and the kimchi hot pot are related foods having a high mutual similarity. Therefore, the processor may calculate the reliability score of the corresponding evaluation information to be high even when the time taken for evaluating "good" for the food called the kimchi stew is less than or equal to the preset threshold time. Here, the high mutual similarity may indicate that an association score is higher than a preset threshold score. For example, when an association score between the kimchi stew and the kimchi hot pot is higher than the preset threshold score, the kimchi stew and the kimchi hot pot may correspond to associated foods that are highly similar to each other.

In addition, the processor may store evaluation information on the basis of a comparison between the calculated reliability score and the preset threshold value. For example, the processor may store the evaluation information in a normal evaluation information DB in response to the calculated reliability score being greater than or equal to the preset threshold value. As another example, the processor may store the evaluation information in an abnormal evaluation information DB in response to the calculated reliability score being less than the preset threshold value.

Meanwhile, the processor may collect evaluation information including an evaluation of each of a plurality of foods by using a first neural network model. The processor may input, into the first neural network model as input data, the evaluation information, the time taken for the evaluation, and the difference between the evaluation information regarding at least one of the plurality of foods and the evaluation information regarding the associated food thereof and acquire a reliability score as output data.

Hereinafter, an example of evaluation information including an evaluation of each of a plurality of foods and a reliability score of the evaluation information will be described with reference to FIG. 5.

FIG. 5 is a view illustrating an example of evaluation information including an evaluation of each of a plurality of foods and a reliability score of the evaluation information, according to an embodiment.

Referring to FIG. 5, a processor collects, from different users user 1, user 2, and user 3, evaluation information regarding each of a plurality of foods.

As an example, the processor may collect, from a person named user 1, evaluation information "not good" regarding a food called stir-fried octopus. Here, a time taken for an evaluation is 10 ms, and thus, the processor may calculate a reliability score to be high in response to the time being greater than or equal to a preset threshold value of 0.1 ms. In addition, the processor may calculate a reliability score by comparing the evaluation information regarding the stir-fried octopus with a difference between pieces of evaluation information regarding stir-fried webfoot octopus and octopus duruchigi. When the user 1 evaluates the food called the stir-fried webfoot octopus as "best", the processor may calculate a reliability score to be low on the basis of a great difference between "not good" for the food called the stir-fried octopus evaluated by the user 1 and "best" for the food called the stir-fried webfoot octopus evaluated by the user 1. As illustrated in FIG. 5, when the time taken for evaluating the food called the stir-fried octopus is 10 ms and the evaluation information regarding the stir-fried webfoot octopus and the octopus duruchigi is similar to "not good", the processor may calculate a reliability score of the evaluation information "not good" regarding the food called the stir-fried octopus to be 97%.

Referring back to FIG. 4, in operation 320, the processor calculates association scores of the foods on the basis of the evaluation information, and ontology-based information previously possessed for the foods.

The processor may calculate item association scores for one or more items of the foods on the basis of the ontology-based information. In addition, the processor may calculate association scores of the foods on the basis of one or more of the item association scores and the evaluation information.

Meanwhile, the processor may calculate the association scores of the foods by using a second neural network model. The processor may input, into the second neural network model, the ontology-based information previously possessed for the foods as input data and calculate an item association score for at least one item of the foods. In addition, the processor may input at least one of the calculated item association score and the evaluation information into the second neural network model as input data and calculate the association scores of the foods.

Hereinafter, an example of ontology-based information previously possessed for a plurality of foods will be described with reference to FIG. 6.

Figure 6:
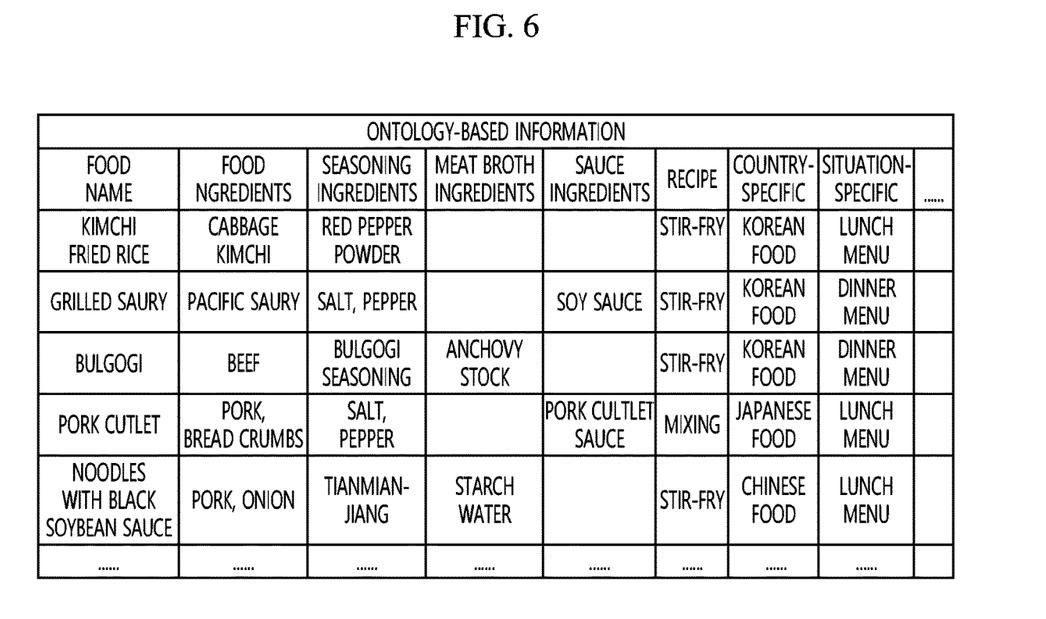
FIG. 6 is a view illustrating an example of ontology-based information previously possessed for a plurality of foods, according to an embodiment.

FIG. 6 is a view illustrating an example of ontology-based information previously possessed for a plurality of foods, according to an embodiment.

Referring to FIG. 6, ontology-based information may include ontology-based information regarding foods such as kimchi fried rice, grilled saury, bulgogi, pork cutlet, and noodles with black soybean sauce. The ontology-based information may include items indicating characteristics of foods, and the items may include a food name, a food ingredient, a seasoning ingredient, a meat broth ingredient, a sauce ingredient, a recipe, a country, a situation, a taste, a texture, a flavor, and the like, but are not limited thereto.

For example, the ontology-based information may include information called "kimchi fried rice" in an item of a food name, information called "cabbage kimchi" in an item of a food ingredient, information called "red pepper powder" in an item of a seasoning ingredient, information called "stir-fried" in an item of a recipe, information called "Korean food" in an item of a country, and information called "lunch menu" in an item of a situation.

As another example, the ontology-based information may include information called "grilled saury" in the item of the food name, information called "pacific saury" in the item of the food ingredient, information called "salt and pepper" in the item of the seasoning ingredient, information called "soy sauce" in the item of the sauce ingredient, information called "stir-fried" in the item of the recipe, information called "Korean food" in the item of the country, and information called "dinner menu" in the item of the situation.

Hereinafter, an example of association scores of a plurality of foods will be described with reference to FIG. 7.

Figure 7:
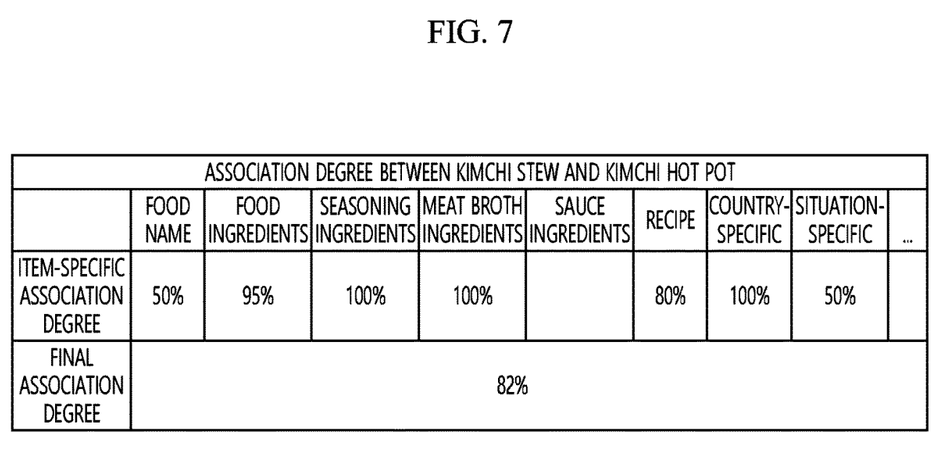
FIG. 7 is a view illustrating an example of association scores of a plurality of foods, according to an embodiment.

FIG. 7 is a view illustrating an example of association scores of a plurality of foods, according to an embodiment.

Referring to FIG. 7, a processor may calculate item association scores for one or more items of foods on the basis of ontology-based information. For example, the processor may calculate one or more item association scores of kimchi stew and kimchi hot pot on the basis of the ontology-based information. Pieces of ontology-based information regarding items of a seasoning ingredient, a meat broth ingredient, and a country of the kimchi stew and the kimchi hot pot are the same as each other, and thus, the processor may calculate item-specific association scores for the respective items to be 100%. Food names of the kimchi stew and the kimchi hot pot has a difference between "stew" and "hot pot", and thus, the processor may calculate an association score of a corresponding item to be 50%. Some of ontology-based information regarding items of a food ingredient, a recipe, and a situation of the kimchi stew and the kimchi hot pot are different, and thus, the processor may calculate in order item-specific association scores for the respective items to be 95%, 80%, and 50%.

In addition, the processor may calculate association scores of the foods on the basis of one or more of the item association scores and evaluation information. The processor may calculate association scores of the foods on the basis of the item association scores, may calculate the association scores of the foods on the basis of the evaluation information, and may calculate the association scores of the foods on the basis of the item association scores and the evaluation information.

The processor may calculate the association scores on the basis of the item association scores. The processor may calculate the association scores on the basis of association scores of all the items, and may calculate the association scores on the basis of association scores of particular items. For example, the processor may calculate a final association score between the kimchi stew and the kimchi hot pot, on the basis of only association scores of the items of the food name and the situation. In addition, the processor may calculate the final association score on the basis of association scores of the items of the food name, the food ingredient, the seasoning ingredient, the meat broth ingredient, the sauce ingredient, the recipe, the country, and the situation. The processor may calculate different final association scores on the basis of an item association score of a particular item.

The processor may calculate the association scores of the foods on the basis of the evaluation information. As an example, the processor may calculate association scores of foods having high evaluation information to be high.

The processor may calculate the association scores of the foods on the basis of the item association scores and the evaluation information. For example, when foods have high item association scores but have pieces of evaluation information showing a great difference, the processor may calculate association scores of the corresponding foods to be low.

Referring back to FIG. 4, in operation 330, the processor recommends at least one food on the basis of first behavioral information of a user and the association scores.

The first behavioral information may include at least one of information regarding a food clicked by the user before receiving a recommendation of the food, a stay time on a page indicating the clicked food, information indicating whether or not the clicked food is added to a shopping cart, and information regarding a purchase history of the clicked food.

Meanwhile, the processor may receive the first behavioral information of the user. The processor may receive the first behavioral information according to an input of the user. The processor may receive first behavioral information of a purchaser from a purchaser terminal.

In addition, the processor may recommend one or more foods on the basis of the first behavioral information and the association scores. For example, when the information regarding the food clicked by the user before receiving the recommendation of the food includes kimchi stew, a stay time on a page indicating the kimchi stew is greater than or equal to 30 seconds, the kimchi stew is added to a shopping cart, or a history of purchasing the kimchi stew is present, the processor may recommend foods having high association scores with the kimchi stew.

Meanwhile, the processor may recommend one or more foods by using a third neural network model. The processor may input the first behavioral information and the association scores as input data into the third neural network model and acquire one or more foods as output data.

Meanwhile, the processor may recommend various foods by using association scores based on various combinations of items. As an example, the processor may recommend a food having the highest association score by using an association score calculated as an association score of an item of a food ingredient. As another example, the processor may recommend a food having the highest association score by using association scores calculated by using association scores of items of a country and a situation. As another example, the processor may recommend a food having the highest association score by using association scores calculated by using association scores of items of a recipe and a meat broth ingredient.

Meanwhile, the processor may update a reliability score of the evaluation information by using the calculated association scores. As described above, the processor may calculate the reliability score of the evaluation information on the basis of the evaluation information, a time taken for an evaluation, and a difference between the evaluation information and evaluation information regarding one or more associated foods of the plurality of foods. Here, the processor may update the one or more associated foods of the plurality of foods by using the calculated association scores, in relation to the difference between the evaluation information and the evaluation information regarding the one or more associated foods. In addition, the processor may update the reliability score of the evaluation information on the basis of the difference between the evaluation information and evaluation information regarding the updated one or more associated foods. According to an embodiment, the processor may more accurately recommend a food that suits the taste of the user, by using the updated reliability score of the evaluation information.

Meanwhile, the processor may receive second behavioral information of the user and update the association score by using the second behavioral information. The second behavioral information may include at least one of purchase information, click information, shopping cart information, and one-time purchase amount information of the user corresponding to the recommended food. In addition, the second behavioral information may include a purchase conversion rate, a click rate, and a shopping cart addition rate corresponding to the recommended food. For example, when the user purchases the recommended food, the processor may update an association score corresponding to the recommended food by calculating the association score to be higher by using the purchase information of the user included in the second behavioral information. As another example, when the user clicks the recommended food, the processor may update the association score corresponding to the recommended food by calculating the association score to be higher by using the click information of the user included in the second behavioral information. As another example, when the user purchases the recommended food, the processor may update the association score corresponding to the recommended food by calculating to be higher by using the shopping cart information of the user included in the second behavioral information.

Hereinafter, another example of a system for user's food taste intelligence-based personalization recommendations according to an embodiment will be described with reference to FIG. 8.

Figure 8:
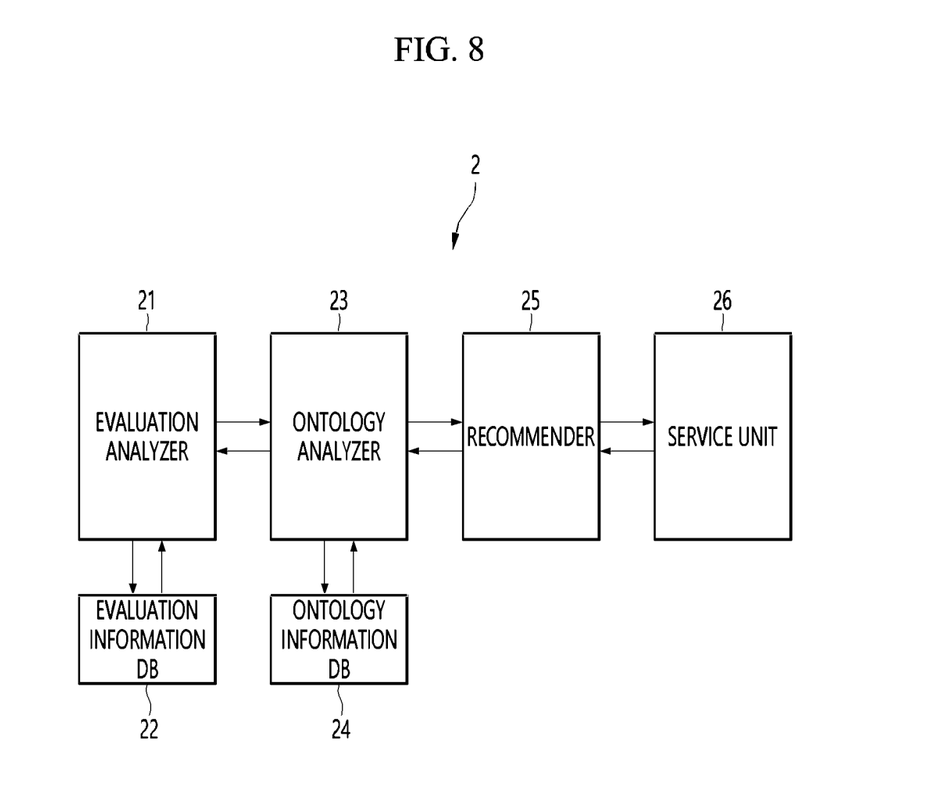
FIG. 8 is a block diagram illustrating another example of a system for user's food taste intelligence-based personalized recommendations, according to an embodiment.

FIG. 8 is a block diagram illustrating another example of a system for user's food taste intelligence-based personalized recommendations, according to an embodiment.

Referring to FIG. 8, a system 2 includes an evaluation analyzer 21, an evaluation information DB 22, an ontology analyzer 23, an ontology information DB 24, a recommender 25, and a service unit 26.

The evaluation analyzer 21 collects evaluation information including an evaluation of each of a plurality of foods and stores the collected evaluation information in the evaluation information DB 22. Also, the evaluation analyzer 21 calculates a reliability score of the evaluation information on the basis of the evaluation information, a time taken for the evaluation, and a difference between evaluation information regarding at least one of the plurality of foods and evaluation information regarding an associated food thereof. In addition, the evaluation analyzer 21 stores the evaluation information on the basis of a comparison between the calculated reliability score and a preset threshold value. Here, the evaluation analyzer 21 may update the evaluation information in the evaluation information DB 22 or store the evaluation information in a normal evaluation information DB (not shown), in response to the calculated reliability score being greater than or equal to the preset threshold value, and may store the evaluation information in an abnormal evaluation information DB (not shown) in response to the calculated reliability score being less than the preset threshold value.

Meanwhile, the evaluation analyzer 21 may collect the evaluation information including the evaluation of each of the plurality of foods by using a first neural network model. The evaluation analyzer 21 may input, into the first neural network model as input data, the evaluation information, the time taken for the evaluation, and the difference between the evaluation information regarding at least one of the plurality of foods and the evaluation information regarding the associated food thereof and acquire the reliability score as output data.

The ontology analyzer 23 calculates association scores of the foods on the basis of the evaluation information and ontology-based information previously possessed for the foods. The ontology analyzer 23 receives the evaluation information from the evaluation analyzer 21 or the evaluation information DB 22. The previously possessed ontology-based information refers to information stored in the ontology information DB 24. The ontology analyzer 23 calculates item association scores for one or more items of the foods on the basis of the ontology-based information. In addition, the ontology analyzer 23 calculates association scores of the foods on the basis of one or more of the item association scores and the evaluation information.

Meanwhile, the ontology analyzer 23 may calculate the association scores of the foods by using a second neural network model. The ontology analyzer 23 may input the ontology-based information previously possessed for the foods as input data into the second neural network model and calculate an item association score for at least one item of the foods. In addition, the ontology analyzer 23 may input at least one of the calculated item association score and the evaluation information into the second neural network model as input data and calculate association scores of the foods.

The recommender 25 recommends one or more foods on first behavioral information of a user and the association scores. The recommender 25 receives the first behavioral information of the user from the service unit 26. The recommender 25 receives the association scores from the ontology analyzer 23. The recommender 25 may provide a food recommendation list generated on the basis of the first behavioral information of the user and the association scores. The food recommendation list includes recommendation lists according to various situations, such as an order of high correlations among all items of the foods, an order of high correlations among food ingredient items of the foods, and an order of high correlations among particular items of the foods.

Meanwhile, the recommender 25 may provide one or more foods by using a third neural network model. The recommender 25 may input the first behavioral information and the association scores as input data into the third neural network model and acquire one or more foods as output data.

The service unit 26 may provide the recommendation list by using the foods output by the recommender 25. Here, the service unit 26 may be a delivery application or an online food shopping mall.

According to the above description, the processor recommends a food that suits a taste of a user. The user may check various foods that suit the taste of the user and foods that accurately reflect the taste of the user.

The above-described method may be written as a program that may be executed on a computer, and may be implemented in a general-purpose digital computer that operates the program by using a computer-readable recording medium. In addition, the structure of data used in the above-described method may be recorded on a computer-readable recording medium through various means. The computer-readable recording medium includes a storage medium such as a magnetic storage medium (e.g., ROM, RAM, USB, a floppy disk, a hard disk, or the like), and an optical reading medium (e.g., CD-ROM, DVD, or the like).

Meanwhile, the above-described method may be included in a computer program product and provided. The computer program product may be traded between a seller and a purchaser as a product. The computer program product may be distributed in the form of a machine-readable storage medium (e.g., CD-ROM, or may be distributed (e.g., download or upload) through an application store (e.g., Play Store™) or directly or online between two user devices. In the case of online distribution, at least a portion of the computer program product may be at temporarily stored or temporarily generated in a machine-readable storage medium such as a server of a manufacturer, a server of an application store, or a memory of a relay server.

One of ordinary skill in the art related to the present embodiment may understand that the above method may be implemented in a modified form within the scope that does not depart from the essential characteristics of the above description. Therefore, the disclosed methods should be considered in an illustrative sense rather than a limiting sense, and the scope of rights should be defined by claims rather than by the above description, should be interpreted as including all differences within the scope equivalent to the claims.

According to the problem-solving means of the disclosure described above, the disclosure may recommend a food that suits a taste of a user by collecting evaluation information including an evaluation of each of a plurality of foods, calculating association scores of the foods on the basis of the evaluation information, and ontology-based information previously possessed for the foods, and recommending one or more foods on the basis of first behavioral information of the user and the association scores.

Various foods that suit the taste of the user may be recommended by recommending one or more foods on the basis of the evaluation information and the ontology-based information.

Foods that accurately reflect the taste of the user may be recommended by recommending one or more foods on the basis of behavioral information of the user.

The effects of the disclosure are not limited to those mentioned above, and other effects not mentioned will be clearly understood by one of ordinary skill in the art from the following description.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method for user's food taste intelligence-based personalized recommendations, the method comprising:
    collecting evaluation information including evaluations for each of a plurality of foods;
    calculating association scores of the plurality of foods on the basis of the evaluation information, and ontology-based information previously possessed for the foods, wherein the ontology-based information includes recipes for each of the foods;
    determining at least one food on the basis of first online behavioral information of the user and the association scores; and
    providing a recommendation list including the at least one food to be displayed an online webpage,
    wherein the collecting of the evaluation information includes:
    calculating a reliability score of the evaluation information on the basis of the evaluation information, a time taken for the evaluation, and a difference between evaluation information regarding at least one of the plurality of foods and evaluation information regarding an associated food thereof; and
    storing the evaluation information on the basis of a comparison between the reliability score and a preset threshold value.

2. The method of claim 1, wherein the calculating includes:
    calculating an item association score for at least one item of the foods on the basis of the ontology-based information; and
    calculating association scores of the foods on the basis of at least one of the item association score and the evaluation information.

3. The method of claim 1, wherein the ontology-based information includes information regarding at least one item of each of the foods.

4. The method of claim 1, wherein the recommending includes:
    receiving the first online behavioral information of the user; and
    recommending at least one food on the basis of the first online behavioral information and the association scores.

5. The method of claim 1, wherein the first online behavioral information includes at least one of information regarding a food clicked by the user before receiving a recommendation of the food, a stay time on a page indicating the clicked food, information indicating whether or not the clicked food is added to a shopping cart, and information regarding a purchase history of the clicked food.

6. The method of claim 1, further comprising updating the reliability score of the evaluation information by using the calculated association scores.

7. The method of claim 1, further comprising:
    receiving second online behavioral information of the user; and
    updating the association scores by using the second online behavioral information.

8. The method of claim 7, wherein the second online behavioral information includes at least one of purchase information, click information, shopping cart information, and one-time purchase amount information of the user, each corresponding to the recommended food.

9. A computer-readable recording medium having recorded thereon a program for executing the method according to claim 1 on a computer.

10. A computing apparatus comprising:
    at least one memory; and
    at least one processor,
    wherein the at least one processor is configured to
    collect evaluation information including evaluations for each of a plurality of foods,
    calculate association scores of the plurality of foods on the basis of the evaluation information, and ontology-based information regarding the foods, wherein the ontology-based information includes recipes for each of the foods,
    determine at least one food on the basis of first online behavioral information of a user and the association scores,
    provide a recommendation list including the at least one food to be displayed an online webpage, and
    wherein the at least one processor collects the evaluation information by:
    calculating a reliability score of the evaluation information on the basis of the evaluation information, a time taken for the evaluation, and a difference between evaluation information regarding at least one of the plurality of foods and evaluation information regarding an associated food thereof, and
    storing the evaluation information on the basis of a comparison between the reliability score and a preset threshold value.

* * * * *